United States Patent
Yamanaka

[11] Patent Number: 6,052,343
[45] Date of Patent: Apr. 18, 2000

[54] OPTICAL HEAD HAVING A SHADING SLIT

[75] Inventor: Yutaka Yamanaka, Tokyo, Japan

[73] Assignee: NEC Corporation, Japan

[21] Appl. No.: 08/925,533

[22] Filed: Sep. 8, 1997

[30] Foreign Application Priority Data

Sep. 13, 1996 [JP] Japan ................... 8-242945

[51] Int. Cl.⁷ .................................. G11B 7/12
[52] U.S. Cl. .................. 369/44.24; 369/112; 369/118
[58] Field of Search .................. 369/44.24, 44.23, 369/44.14, 44.12, 44.11, 44.27, 44.28, 44.32, 44.41, 109, 112, 118

[56] References Cited

U.S. PATENT DOCUMENTS 5,322,993  6/1994  Ohyama .................. 369/44.24 X

FOREIGN PATENT DOCUMENTS 61-45418  3/1986  Japan .................. 369/44.24

OTHER PUBLICATIONS

Tsuchiya et al; "Study of Compatibility for 2 Types of Discs"; p. 956; 29a–ZA–6, in Extracted Abtracts of 56th Autumn Meeting, 1995 of JSAP.

*Primary Examiner*—Muhammad N. Edun
*Attorney, Agent, or Firm*—Hayes, Soloway, Hennessey, Grossman & Hage, P.C.

[57] ABSTRACT

To provide an optical head having a shading slit wherein aberration characteristic is effectively improved without hindering the high-speed operation or the miniaturization thereof, an optical head has an optical system for detecting a light reflected from a micro spot of an optical disk where a laser light is converged by an object lens (4), which comprises a shading slit (3) for restricting the laser light to pass through opposite peripheries of the object lens.

5 Claims, 2 Drawing Sheets

1 : SEMICONDUCTOR LASER
2 : HALF-MIRROR
3 : SHADING SLIT
4 : OBJECT LENS
5 : OPTICAL DISK
6 : PHOTO-DETECTOR
3 1 : TRANSPARENT PLATE
3 2 : SHADING STRIP

1 : SEMICONDUCTOR LASER
2 : HALF-MIRROR
3 : SHADING SLIT
4 : OBJECT LENS
5 : OPTICAL DISK
6 : PHOTO-DETECTOR
3 1 : TRANSPARENT PLATE
3 2 : SHADING STRIP

3 : SHADING SLIT
4 : OBJECT LENS
5 : OPTICAL DISK
3 1 : TRANSPARENT PLATE
3 2 : SHADING STRIP
4 1 : OPPOSITE PERIPHERIES

11 : SEMICONDUCTOR LASER
12 : HALF-MIRROR
13 : SHADING CIRCLE
14 : OBJECT LENS
15 : OPTICAL DISK
16 : PHOTO-DETECTOR

OPTICAL HEAD HAVING A SHADING SLIT

BACKGROUND OF THE INVENTION

The present invention relates to an optical head to be used for read/write of optical recording media having different substrate thicknesses, such as DVD (Digital Video Disk) and CD (Compact Disk).

In optical disk devices employed for these optical recording media, there is used an optical head which focuses a laser beam on a micro spot of a recording face through a transparent substrate protecting the recording face wherein preciseness of the micron order is required.

In these optical disk devices where the convergence beam passes through a parallel plate of the transparent substrate, a wave front aberration is caused depending on thickness of the parallel plate. Here, the wave front aberration means variance of iso-phase wave front from true sphere. If the variance becomes so large that the focussing spot spreads wider than the diffraction limit, sufficient read/write performance cannot be obtained. Therefore, object lenses employed for the optical heads are generally designed to compensate for the wave front aberration, for obtaining a focussing spot comparable to the diffraction limit.

However, as above described, there are optical disks designed to have different substrate thicknesses according to their usage, such as DVD and CD. When the substrate thickness differs, compensation value of the wave front aberration should differ, resulting in that an optical head designed for a specific substrate thickness cannot read/write optical disks having different substrate thickness because of unmatched compensation values of the wave front aberration.

For dealing with the above problem, a method of restricting lens aperture is proposed in Extracted Abstracts of the 56th Autumn Meeting, 1995 of the Japan Society of Applied Physics, 29a-ZA-6, p.956.

FIG. 3 is a perspective view illustrating the prior proposal, wherein a laser light from a semiconductor laser 11 through a half-mirror 12 and a shading circle 13 is converged by an object lens 14 on a micro spot of a recording face of an optical disk 15. Reflected laser light from the optical disk 15 is separated by the half-mirror 12 to be detected by a photo-detector 16.

In front of the object lens 14, the shading circle 13 having a circular aperture is provided for restricting the light beam from the semiconductor laser 11. The shading circle 13 shades the light beam passing through the periphery of the object lens 14 wherein the aberration is comparatively large.

By thus eliminating the effect of the wave front aberration, reproduction of optical disks having different substrate thicknesses is enabled in the prior proposal.

However, the center of the shading circle 13 must be arranged on the same axis with the center of the object lens 14, in the method of the prior proposal, which needs two-dimensional positioning of the shading circle 13 on a plane parallel to the object lens 14. The two-dimensional positioning makes assembling of the optical head somewhat difficult, and may be accompanied a positioning error causing invalid shading effect.

Furthermore, there is another problem in that the shading circle 13 must be shifted unison with the object lens 14 when the object lens 14 is shifted in a radial direction of the optical disk 15, perpendicular to the recording track, for fine tracking of the recording face in read/write operation of the optical disk 15, which requires a somewhat larger shifting mechanism, hindering high-speed operation as well as miniaturization of the optical head.

SUMMARY OF THE INVENTION

Therefore, a primary object of the present invention is to provide an optical head having a shading slit wherein aberration characteristic is effectively improved without hindering the high-speed operation or the miniaturization thereof.

In order to achieve the above object, an optical head of the invention, having an optical system for detecting a light reflected from a micro spot of an optical disk where a laser light is converged by an object lens, comprises a shading slit for restricting the laser light passing through opposite peripheries of the object lens.

In the optical head, the laser light is preferably restricted by the shading slit only when the laser light is to be converged on a micro spot of an optical disk having a different substrate thickness to that according whereto the object lens is designed, the direction wherein the peripheries are opposite is preferably parallel to a tracking direction of the optical disk, and the shading slit has preferably a certain length in a direction perpendicular to the tracking direction for enabling shifting the object lens along therewith independently for fine tracking.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
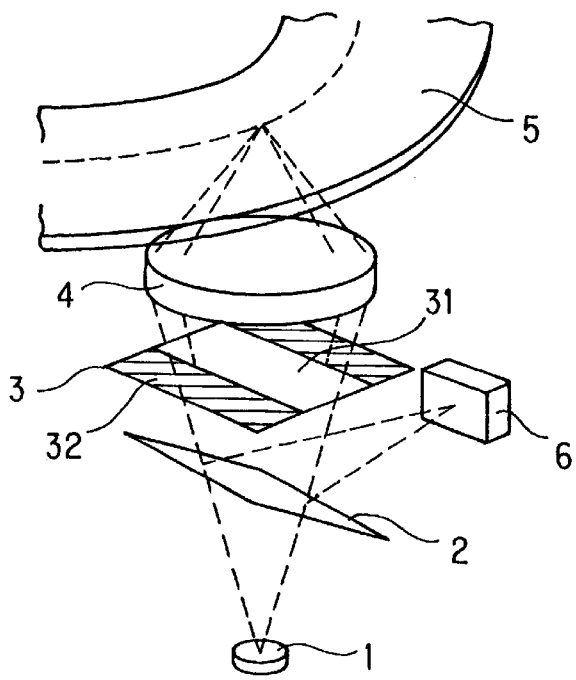
FIG. 1 is a perspective view illustrating an embodiment of the invention.
Figure 2:
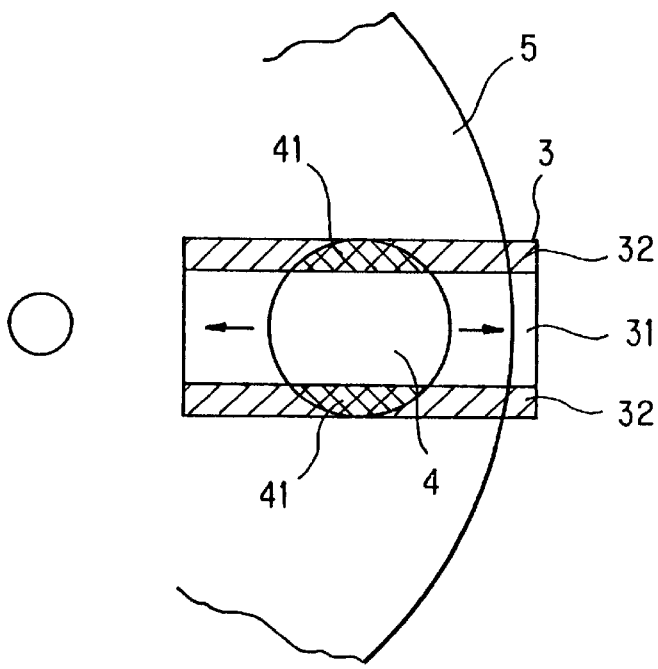
FIG. 2 is a plane view illustrating principal parts of the embodiment of FIG. 1.

FIG. 1 is a perspective view illustrating an embodiment of the invention and FIG. 2 is a plane view illustrating principal parts thereof.

Referring to FIGS. 1 and 2, the optical head according to the embodiment comprises a semiconductor laser 1, a half-mirror 2, an object lens 4, a photo-detector 6, and a shading slit 3 which will be described afterwards. A laser light from the semiconductor laser 1 passes the half-mirror 2 and the shading slit 3, and it is converged by the object lens 4 on a micro spot of the recording face of an optical disk 5. Reflected laser light from the optical disk 5 is separated by the half-mirror 2 to be detected by the photo-detector 6.

The shading slit 3 is formed with a pair of parallel shading strips 32 provided on a transparent plate 31 along with its two sides. The shading slit 3 is set in front of the object lens 4 so that longitudinal direction thereof is perpendicular to the tracking direction of the optical disk 5 in order to restrict light beams passing through two opposite peripheries 41 of the object lens 4. The shading slit 3 is set fixedly to the optical head, while the object lens 4 is set movable against the optical head in the radial direction of the optical disk 5 for enabling fine tracking of the optical disk 5.

Therefore, even when the object lens 4 is designed to compensate the wave front aberration corresponding to substrate thickness of a certain type of optical disks, the optical head according to the embodiment can read/write another type of optical disks having different substrate thickness. It is because the effect of the uncompensated wave front aberration due to substrate thickness difference can be practically eliminated by shading the two opposite peripheries 41 of the object lens 4 with the shading slit 3.

Figure 3:
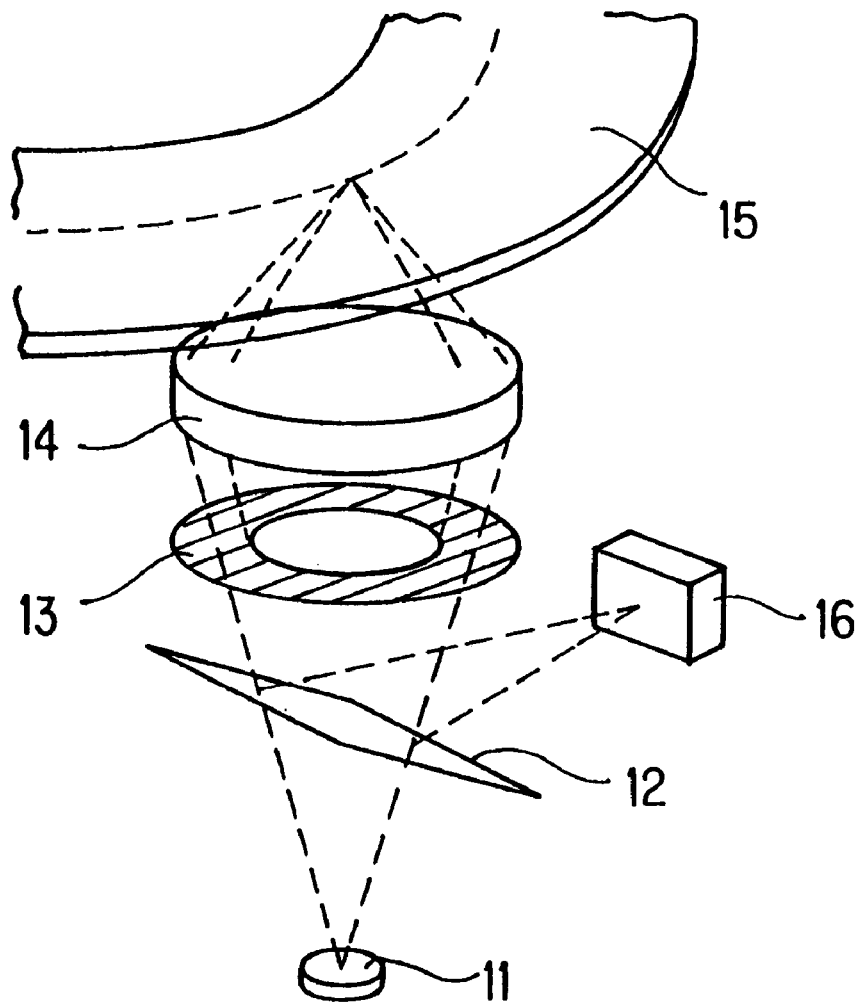
FIG. 3 is a perspective view illustrating an optical head of a prior art proposal.

The shading slit 3 does not shade all the peripheries, and the improvement effect of the wave front aberration is theoretically inferior to the shading circle 13 of the prior proposal of FIG. 3. However, experimental results show it provides sufficient improvement in the read/write performance.

In return, the shading slit 3 of the embodiment has a merit in that the shading slit 3 needs but one-dimensional positioning, that is, it is sufficient to adjust the center line of the shading slit 3 to the light axis of the object lens 4, enabling easier assembling of the optical head than the shading circle 13 needing two-dimensional positioning.

Furthermore, as the shading slit 3 is disposed along with the radius direction of the optical disk 5, the shading effect does not vary even when only the object lens 4 is shifted a little for the fine tracking in the radius direction, giving the same read/write performance. Therefore, the shading slit 3 may be fixed to the optical head, needing no additional mechanism for shifting the shading slit 3 together with the object lens 4. This is another advantage of the embodiment.

The shading slit 3 might be set parallel to the tracking direction. However, bit errors caused by the aberration of the object lens 4 in the tracking direction can be discriminated and corrected logically to some extent, while random cross talk between adjacent tracks caused by the aberration in the radius direction degrades S/N ratio of the reproduced signals. Therefore, the shading slit 3 preferably is better to be set in the radius direction, in order to reduce the aberration in the radius direction of the optical disk 5 when there is but little margin of the S/N ratio in the reproduced signals, without detracting from the above advantage of requiring no additional mechanism.

Heretofore, the present invention is described in connection with the embodiment of FIG. 1. However, various applications can be considered in the scope of the invention. For example, the shading slit 3 may be made removable or may be formed by a liquid crystal shutter for achieving full use of the lens performance without shading, by arranging the object lens 4 to compensate most effectively the aberration corresponding to the substrate thickness of the optical disks needing the lens performance. And as to the object lens 4, the same effect of the invention is obtained when it is combined with a collimating lens, for example.

What is claimed is:

1. An optical head having an optical system for detecting a light reflected from a micro spot of an optical disk where a laser light is converged by an object lens; said optical head comprising a straight line shading slit for restricting the laser light passing through opposite peripheries of the object lens.

2. The optical head as claimed in claim 1, wherein the laser light is restricted by said shading slit when the laser light is to be converged on a micro spot of an optical disk having a different substrate thickness to that according to that for which the object lens is designed.

3. The optical head as claimed in claim 1, wherein said opposite peripheries are parallel to a tracking direction of the optical disk.

4. The optical head as claimed in claim 1, wherein said shading slit runs in a direction perpendicular to said tracking direction for enabling shifting of the object lens along therewith independently for a fine tracking.

5. An optical head as claimed in claim 1, wherein said shading slit is defined by a pair of parallel shading strips.

* * * * *